(12) United States Patent
Kaya et al.

(10) Patent No.: US 10,026,146 B2
(45) Date of Patent: *Jul. 17, 2018

(54) IMAGE PROCESSING DEVICE INCLUDING A PROGRESS NOTIFIER WHICH OUTPUTS A PROGRESS SIGNAL

(71) Applicant: Renesas Electronics Corporation, Tokyo (JP)

(72) Inventors: Toshiyuki Kaya, Tokyo (JP); Katsushige Matsubara, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,911

(22) Filed: Aug. 30, 2017

(65) Prior Publication Data

US 2017/0365033 A1   Dec. 21, 2017

Related U.S. Application Data

(63) Continuation of application No. 14/170,275, filed on Jan. 31, 2014, now Pat. No. 9,786,025.

(30) Foreign Application Priority Data

Feb. 13, 2013   (JP) .................................. 2013-025666

(51) Int. Cl.
*H04N 19/44* (2014.01)
*G06T 1/20* (2006.01)
(Continued)

(52) U.S. Cl.
CPC ............ *G06T 1/20* (2013.01); *G06F 17/3028* (2013.01); *H04N 19/423* (2014.11); *H04N 19/44* (2014.11); *H04N 19/85* (2014.11)

(58) Field of Classification Search
None
See application file for complete search history.

(56) References Cited

U.S. PATENT DOCUMENTS 5,926,227 A   7/1999   Schoner et al.
5,949,734 A   9/1999   Matano
(Continued)

FOREIGN PATENT DOCUMENTS

JP   H02-203690 A   8/1990
JP   H08-172602 A   7/1996
(Continued)

OTHER PUBLICATIONS

European Search Report dated Jun. 5, 2014.
(Continued)

*Primary Examiner* — Bernard Krasnic
(74) *Attorney, Agent, or Firm* — McGinn IP Law Group, PLLC (57) ABSTRACT

An image processing device includes a decoded data memory, a format-converted data memory, a decoder which decodes compressed image data in units of blocks, writes the decoded data in the blocks into the decoded data memory, and receives a notification that writing of the decoded data has been completed, and a progress notifier which is notified of completion of writing of the decoded data by the decoder, and generates and outputs upon completion of the decoding of a block of data or the writing of a block of the decoded data, a progress signal per picture.

16 Claims, 7 Drawing Sheets

(51) Int. Cl.
 *H04N 19/85* (2014.01)
 *H04N 19/423* (2014.01)
 *G06F 17/30* (2006.01)

(56) References Cited

U.S. PATENT DOCUMENTS

| | | | |
|---|---|---|---|
| 6,304,606 | B1 | 10/2001 | Murashita |
| 7,039,245 | B1 | 5/2006 | Hamery |
| 2003/0007565 | A1* | 1/2003 | Morishita .............. G06T 3/4007 375/240.18 |
| 2008/0301681 | A1 | 12/2008 | Sakamoto |
| 2009/0016620 | A1 | 1/2009 | Todoroki |
| 2010/0040299 | A1 | 2/2010 | Noh |
| 2012/0294376 | A1 | 11/2012 | Tanaka |

FOREIGN PATENT DOCUMENTS

| | | |
|---|---|---|
| JP | H10-098709 A | 4/1998 |
| JP | H11-275575 A | 10/1999 |
| JP | 2003-169326 A | 6/2003 |

OTHER PUBLICATIONS

Japanese Office Action dated May 24, 2016, with a partial English translation.
Chinese Office Action dated Oct. 31, 2017 with English translation thereof.
European Office Action dated Dec. 8, 2017 in Application No. 14152682.2.

* cited by examiner

IMAGE PROCESSING DEVICE INCLUDING A PROGRESS NOTIFIER WHICH OUTPUTS A PROGRESS SIGNAL

The present Application is a Continuation application of U.S. patent application Ser. No. 14/170,275, which was filed on Jan. 31, 2014.

CROSS-REFERENCE TO RELATED APPLICATIONS

The disclosure of Japanese Patent Application No. 2013-025666 filed on Feb. 13, 2013 including the specification, drawings and abstract is incorporated herein by reference in its entirety.

BACKGROUND

The present invention relates to image processing and relates to a technology for, for example, decoding compressed image data and performing format-conversion on the decoded data.

Still images and moving images are both configured to be stored/transmitted in compressed states for capacity saving of a medium for storing images and improvement in image transmission speed. In the present specification, when just a word "image" is used, it includes both of the still image and the moving image. In addition, the "image" and "image data" which is data indicating the image are used in the same meaning unless otherwise specifically described.

A device (hereinafter, referred to as an "image utilization device") on the side that a compressed image is utilized includes a decoder meeting the compression standards (JPEG, MPEG and so forth) of the image and decodes the image by the decoder.

There are cases when an output format of the decoder and a format (hereinafter, referred to as a "utilization format") that the image utilization device uses for display are different from each other. For example, 3planar is known as an example of an image format (corresponding to the "utilization format") that Android (a registered trademark) which is OS which is frequently adopted in a smartphone which is one of the image utilization device is allowed to handle as system requirements. On the other hand, 2planar is generally known as an example of the output format of the decoder.

Therefore, it is required to convert the format of image data (decoded data) which has been output from the decoder to the utilization format in the image utilization device.

Technologies which have been made from various viewpoints are proposed for the image utilization device for which both of decoding of the compressed data and format-conversion of the decoded image data are required.

For example, in Japanese Unexamined Patent Publication No. Hei 11 (1999)-275575, there is disclosed a technique for allowing an MPEG decoding device that both of an MPEG decoder for decoding an MPEG image and a format conversion unit for undertaking format-conversion of decoded image data are built in to carry out the format-conversion in both of the exterior and the interior of the MPEG decoding device. The MPEG decoding device to which the above-mentioned technique is applied includes a selector for selectively outputting an output of the MPEG decoder and an output of the format conversion unit. If an external frame memory is coupled to the format conversion unit and the selector prefers to select the output of the format conversion unit, the MPEG encoding device will be allowed to perform processing up to format-conversion. On the other hand, if the selector prefers to select the output of the MPEG decoder and another format conversion unit is installed on the outside of the MPEG decoding device, the MPEG decoding device will be allowed to operate simply as the decoder.

In addition, in Japanese Unexamined Patent Publication No. 2003-169326, there is disclosed a technology that prior to decoding of encoded data (an compressed image), a picture is divided into a plurality of regions per picture and decoding and format-conversion are sequentially and alternately executed again and again in units of divided regions in order to save the capacity of the memory required for decoding and format-conversion. According to this technology, it is allowed to save the memory capacity in comparison with a case that the whole data, that is, one-picture data (data corresponding to one picture) is stored.

Further, in Japanese Unexamined Patent Publication No. Hei 8 (1996)-172602, there is disclosed a technology that in displaying a compressed image, the compressed data is decoded and written into a memory, the decoded data which has been written into the memory is read out by an FIFO in accordance with an output format and is temporarily stored. In this technology, writing of the data from the decoder to the memory is performed in units of blocks and reading of the data from the memory is performed in units of lines by laser scanning for the purpose of capacity saving of the memory for storing the decoded data similarly to the technology described in Japanese Unexamined Patent Publication No. 2003-169326.

The technology disclosed in Japanese Unexamined Patent Publication No. Hei 11(1999)-275575 is configured such that the decoded data is output from the MPEG decoder directly to the format conversion unit both in a case where the data is format-converted by the formant conversion unit built into the MPEG decoding device and in a case where the data is format-converted by the format conversion unit installed on the outside of the MPEG decoding device (see FIGS. 1 to 3 in Japanese Unexamined Patent Publication No. Hei 11 (1999)-275575).

Therefore, there is such a disadvantage that, for example, when processing of format-conversion is delayed, it becomes difficult for the MPEG decoder to transfer the decoded data to the format conversion unit and execution of decoding and/or processing of the entire system delays. This disadvantage will cause to give a user an unpleasant filling, in particular, in case of an image utilization device such as video chat, a wireless display or the like that a reduction in time taken until the compressed data is displayed after it has been input into the decoder is desired.

In the technology disclosed in Japanese Unexamined Patent Publication No. 2003-169326, although it is allowed to perform a process of dividing the picture concerned prior to decoding on a still image of JPEG system or the like in many cases, it is difficult to perform the above-mentioned process on a moving image in many cases. In addition, there is also such a disadvantage that control of picture division and divided-region-based decoding/format-conversion is complicated and a load is imposed on the CPU.

The technology disclosed in Japanese Unexamined Patent Publication No. Hei 8(1996)-172602 inevitably uses a memory controller (corresponding to a "synchronizing signal generator" in the embodiment of Japanese Unexamined Patent Publication No. Hei 8(1996)-172602) that generates timings at which addresses in the memory are controlled, the data is written into the memory and the data is read out from the memory. As illustrated in FIG. 3 or the like in Japanese Unexamined Patent Publication No. Hei 8(1996)-172602, since this synchronizing signal generator generates the timings of data writing, data reading and so forth on the basis of a timing (a horizontal synchronizing signal, a vertical synchronizing signal and so forth) upon data display, control is complicated and the decoder may be kept waiting for the convenience of display. As a result, such a disadvantage occurs that execution of decoding and/or processing of the entire system is delayed.

Other subject matters and novel features of the present invention will become apparent from the description of the present specification and appended drawings.

SUMMARY

According to one embodiment of the present invention, an image processing device includes a decoded data memory, a format-converted data memory, a decoder, a progress notification unit, and a format conversion unit.

The decoded data memory is adapted to store decoded data obtained by decoding compressed image data, and the format-converted data memory is adapted to store format-converted data obtained by performing format-conversion on the decoded data.

The decoder decodes the compressed image data in units of blocks and writes the decoded data in the blocks into the decoded data memory.

The progress notification unit generates and outputs a progress signal indicating a state of progress that data is being decoded by the decoder or a state of progress that the data is being written into the decoded data memory by the decoder per picture.

The format conversion unit reads out the decoded data from the decoded data memory and performs format-conversion on the data, and writes the format-converted data into the format-converted data memory. The format conversion unit acquires information indicating an address of decoded data which is readable from the decoded data memory from the progress signal from the progress notification unit.

Incidentally, those that the image processing device of the above-mentioned embodiment is expressed by replacing it with a method and a system, an image utilization device such as an image display device or the like including the image processing device and so forth are effective as aspects of the present invention.

According to the above-mentioned one embodiment of the present invention, high-speed execution of image processing including decoding and format-conversion is allowed by simple control.

DETAILED DESCRIPTION

For clarification of explanation, the following description and drawings are appropriately omitted and simplified. In addition, in the respective drawings, the same numerals are assigned to the same elements and duplicate description is omitted as required.

First Embodiment

Figure 1:
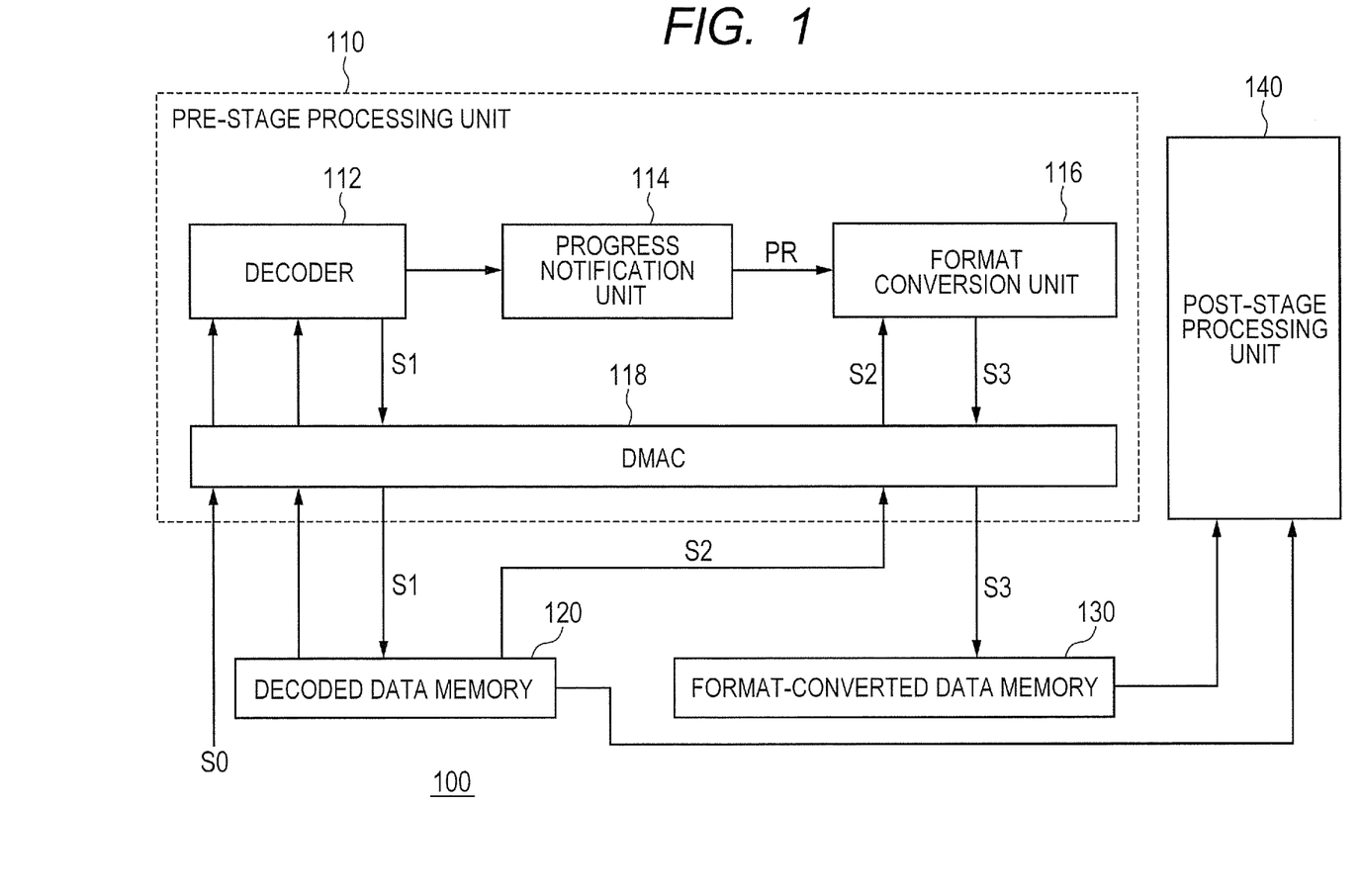
FIG. 1 is a diagram illustrating an example of an image processing device according to a first embodiment of the present invention.

FIG. 1 illustrates an example of an image processing device 100 according to a first embodiment of the present invention. The image processing device 100 includes a pre-stage processing unit 110, a decoded data memory 120, a format-converted data memory 130, and a post-stage processing unit 140 and a bitstream S0 which is compressed image data is input into the device 100. Incidentally, in FIG. 1, a CPU (Central Processing Unit) which is generally included in the device of this type is omitted.

The pre-stage processing unit 110 performs decoding of the bitstream S0 and format-conversion of decoded data. The post-stage processing unit 140 performs processing such as displaying on format-converted data obtained from the pre-stage processing unit 110, or the decoded data and the format-converted data obtained from the pre-stage processing unit 110. Since there are cases when the post-stage processing unit uses the decoded data which is not yet format-converted in addition to the format-converted data depending on the application of the image processing device 100, also a signal line along which data (the decoded data) is output from the decoded data memory 120 to the post-stage processing unit 140 is illustrated in FIG. 1. It goes without saying that in a case where the post-stage processing unit 140 does not use the decoded data, this signal line is not installed.

The pre-stage processing unit 110 includes a decoder 112, a progress notification unit 114, a format conversion unit 116, and a DMAC (Direct Memory Access Controller) 118.

The DMAC 118 sequentially transfers the bitstream S0 to the decoder 112 in accordance with control by the not illustrated CPU.

The decoder 112 decodes the bitstream S0 which has been transferred from the DMAC 118 in units of blocks to obtain decoded data S1, and then writes the decoded data S1 into the decoded data memory 120 via the DMAC 118.

The progress notification unit 114 generates a progress signal PR indicating a state of progress that the data is being decoded by the decoder 112, or a state of progress the data is being written into the decoded data memory 120 by the decoder 112 and outputs the progress signal PR to the format conversion unit 116 per picture.

The progress signal PR is adapted to notify the format conversion unit 116 of an address that decoded data which is readable from the decoded data memory 120 is stored.

The decoder 112 performs decoding and writing of data in units of blocks. The decoder 112 receives a notification that writing of the decoded data in a certain block into the decoded data memory 120 has been completed via the DMAC 118 and thereafter notifies the progress notification unit 114 of completion of writing of the decoded data in the above-mentioned block. Thus, the format conversion unit 116 is allowed to know completion (that is, the data becomes readable) of writing of the decoded data in the block concerned into the decoded data memory 120 by receiving the progress signal PR.

In a case where the decoder 112 notifies the progress notification unit 114 of a decoding time of the data in the block concerned as a decoding completion timing without waiting notification of completion of writing of the decoded data in a certain block into the decoded data memory 120, when there is a sufficient time difference until the format conversion unit 116 receives the progress signal PR after the progress signal PR has been generated in accordance with completion of decoding of one-block data by the decoder 112, the format conversion unit 116 is allowed to perceive that writing of the decoded data in the block concerned into the decoded data memory 120 has been completed by receiving the progress signal PR.

It goes without saying that a difference between a time at which decoding of data in a certain block by the decoder 112 has been completed and a time at which writing of the decoded data in the block concerned into the decoded data memory 120 by the decoder 112 has been completed may be estimated on the high side and the format conversion unit 116 may decide a timing at which a predetermined time has elapsed after reception of the progress signal PR as a timing at which the data in the block concerned becomes readable.

In addition, with regard to an address that the decoded data in the block concerned has been stored in the decoded data memory 120, for example, the progress notification unit 114 may output the number of the block of the data whose decoding by the decoder 112 has been completed to the format conversion unit 116 as the progress signal PR, and the format conversion unit 116 may acquire the address corresponding to the number of the block that the progress signal PR indicates in accordance with a correspondence relation between the number of the block and the address in the decoded data memory 120.

In the above-mentioned case, the progress notification unit 114 may be readily configured by a counter. Specifically, the counter may count up a value per picture, every time decoding of one-block data is completed by the decoder 112, or every time writing of the one-block decoded data into the decoded data memory 120 is completed by the decoder 112, and may output the counted value to the format conversion unit 116 as the progress signal PR. Then, the counted value may be reset every time decoding or writing of one-picture data is completed.

As mentioned above, in the present embodiment, the progress notification unit 114 outputs the progress signal PR indicating the number of the block concerned to the format conversion unit 116 per picture, every time decoding of one-block data 112 or writing of the decoded data performed by the decoder 112 is completed. The format conversion unit 116 is allowed to acquire information indicating the address that the decoded data which has already been made readable from the decoded data memory 120 is stored on the basis of the progress signal PR.

The format conversion unit 116 reads out the decoded data S2 from the decoded data memory 120 and performs format-conversion on the data S2 and writes the format-converted data into the format-converted data memory 130 simultaneously with the decoding operation performed by the decoder 112.

A read-out unit that the data is read out from the decoded data memory 120 by the format conversion unit 116 either may be the same as or may not be the same as a write unit that the data is written by the decoder 112. From the viewpoint of efficiency of access to the memory, it is preferable that the format conversion unit 116 be configured to perform data reading by defining a plurality of blocks as the read-out unit. In order to indicate that the read-out unit that the format conversion unit 116 reads out the data may not to be the same as the write unit that the decoder 112 writes the data, different symbols are respectively assigned in such a manner that S1 is assigned to the data (the decoded data) that the decoder 112 will write into the decoded data memory 120 and S2 is assigned to the data that the format conversion unit 116 will read out from the decoded data memory 120.

In addition, a write unit when the format conversion unit 116 will write format-converted data S3 into the format-converted data memory 130 either may be the same as or may not be the same as a read-out unit when the format conversion unit 116 will read out the decoded data S2 from the decoded data memory 120.

The post-stage processing unit 140 reads out the data from the format-converted data memory 130 or from the format-converted data memory 130 and the decoded data memory 120 to perform processing in accordance with the type of the processing to be executed.

According to the image processing device 100 of the present embodiment, first, it is allowed to simultaneously execute decoding of the compressed image data by the decoder 112 and format-conversion of the decoded data by the format conversion unit 116 by including both of the decoded data memory 120 for storing the decoded data S2 and the format-converted data memory 130 for storing the format-converted data S3, and it is allowed not to put the decoder 112 on standby even when execution of format-conversion delays. Therefore, it is allowed to promote high-speed execution of the decoding and/or the processing of the entire system.

Further, the progress signal PR indicating the number of the latest block decoding of data or writing of data in which has been completed is output from the progress notification unit 114 to the format conversion unit 116 per picture, every time decoding of one-block data or writing of one-block decoded data by the decoder 112 is completed. Thus, the format conversion unit 116 is allowed to know the address that the decoded data which has already been made readable from the decoded data memory 120 is stored on the basis of the progress signal PR. That is, it is allowed to perform format-conversion on the decoded data in the block decoding of which has already been completed in the picture concerned even when the decoder 112 does not yet complete decoding of one-picture data. As a result, high-speed execution of format-conversion is allowed, and as a result of which it is allowed to perform the processing of the entire system at a higher speed.

Further, since the progress notification unit 114 simply notifies the format conversion unit 116 of the state of progress that the data is being decided or written into the decoded data memory 120 by the decoder 112 as control to be executed in order to obtain the above-mentioned advantages, the control is simple.

Here, an operational example of the pre-stage processing unit 110 in the image processing device 100 will be described in detail assuming that the format of the data (the decoded data) that the decoder 112 outputs is 2planar and the format of the data (the format-converted data) that the format conversion unit 116 outputs is 3planar.

Figure 2:
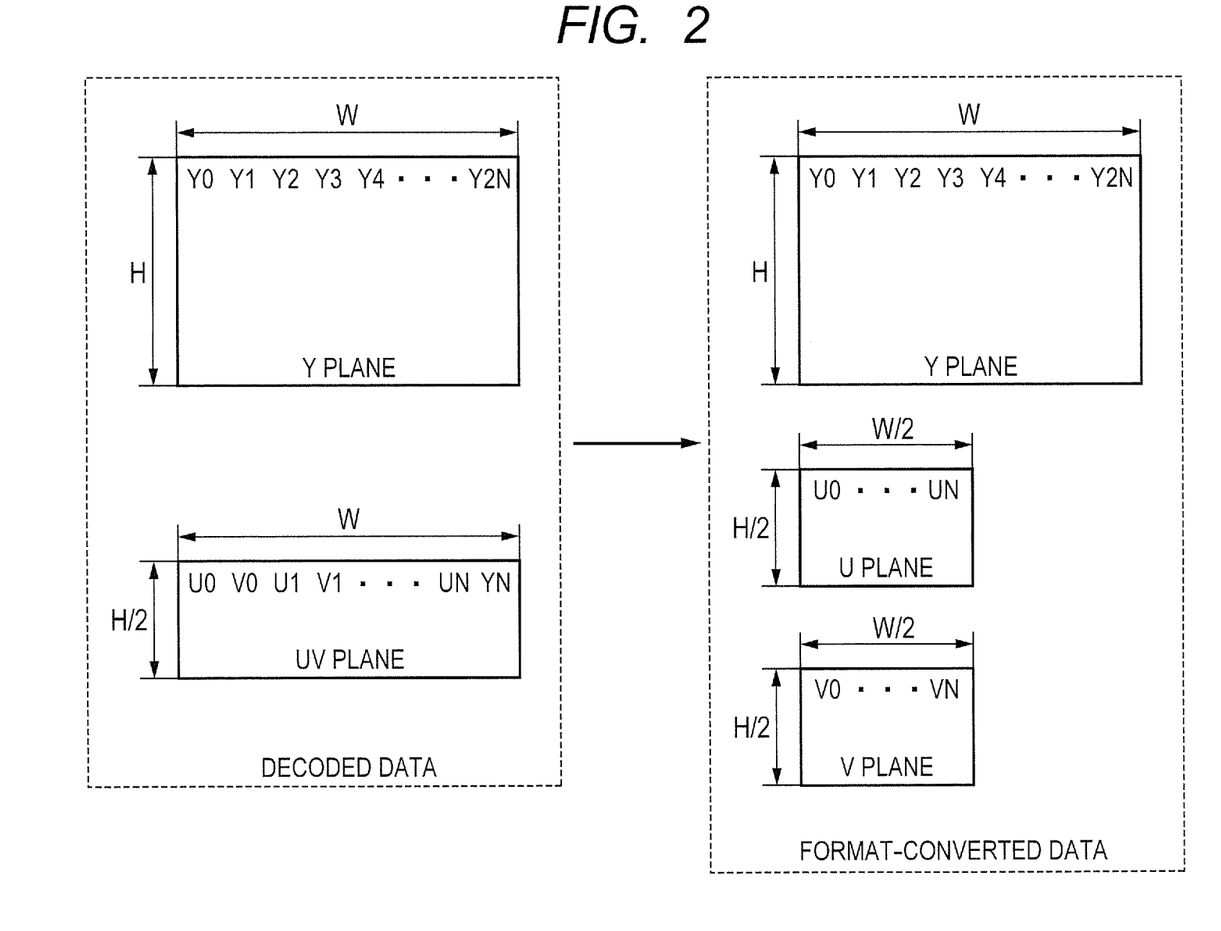
FIG. 2 is a diagram illustrating examples of format-conversion that the image processing device illustrated in FIG. 1 performs.

FIG. 2 illustrates examples of one-picture decoded data having the format of 2planar and one-picture format-converted data having the format of 3planar. In FIG. 2, "Y" denotes a luminance pixel value, "U" and "V" denote a color difference U pixel value and a color difference V pixel value respectively. In addition, a numeral coming after each of Y, U and V indicates a sequence of the pixel concerned.

As illustrated in FIG. 2, the decoded data includes two color planes of one luminance (Y) plane and one color difference (UV) plane. The picture size is W by H in width by height for the Y plane and is W by H/2 in width by height for the UV plane. As apparent from FIG. 2, in the UV plane of the decoded data, the U pixels and the V pixels are alternately arrayed.

On the other hand, the format-converted data includes one Y plane and two color difference planes (one U plane and one V plane). The picture size is W by H in width by height for the Y plane and is W/2 by H/2 in width by height for each of the U and V planes.

That is, the format-conversion in this example is processing of separating the UV plane in the decoded data illustrated on the left side in FIG. 2 into the U plane and the V plane illustrated on the right side in FIG. 2. Incidentally, with regard to the UV plane, if there exist the decoded data of two pixels in total of one U pixel and one V pixel, format-conversion will be allowed. Therefore, a minimum conversion unit of format-conversion is two pixels.

Figure 3:
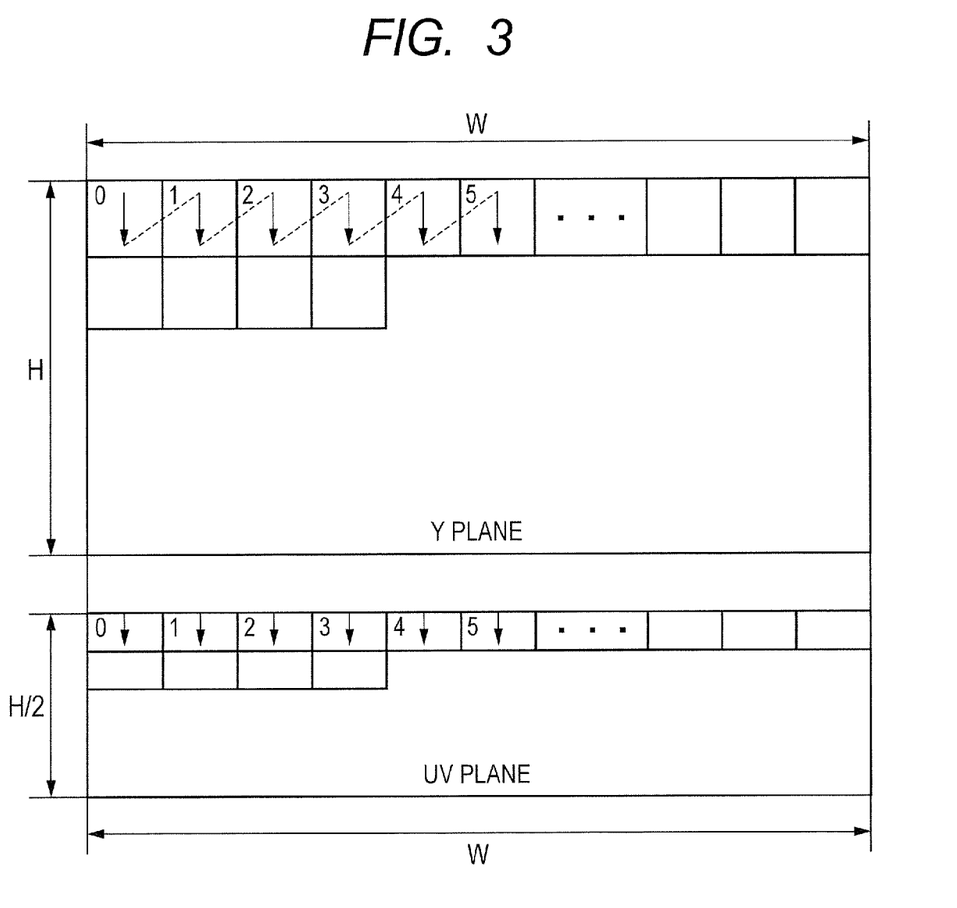
FIG. 3 is a diagram (1) illustrating an example of data decoding and writing into a decoded data memory performed by a decoder in the image processing device illustrated in FIG. 1.

An example of an operation of the decoder 112 will be described with reference to FIG. 3. In FIG. 3, a small square in each color plane indicates a block, and a numeral in each block indicates a decoding order that the data in the block concerned is decoded and a writing order that the data in the block concerned is written into the decoded data memory 120. In addition, one arrow indicates one decoding and writing operation.

As illustrated in FIG. 3, the decoder 112 performs decoding of the data and writing of the decoded data in units of blocks in order going from left to right and from up to down for each picture. For example, in a case where the size of one block is defined to be 16 pixels×16 pixels, when decoding of one-block data is completed, the decoded data of 16 pixel× 16 pixels for the Y plane and 16 pixels×8 pixels (the U pixels: 8×8, and the V pixels: 8×8) for the UV plane are written into the decoded data memory 120.

Figure 4:
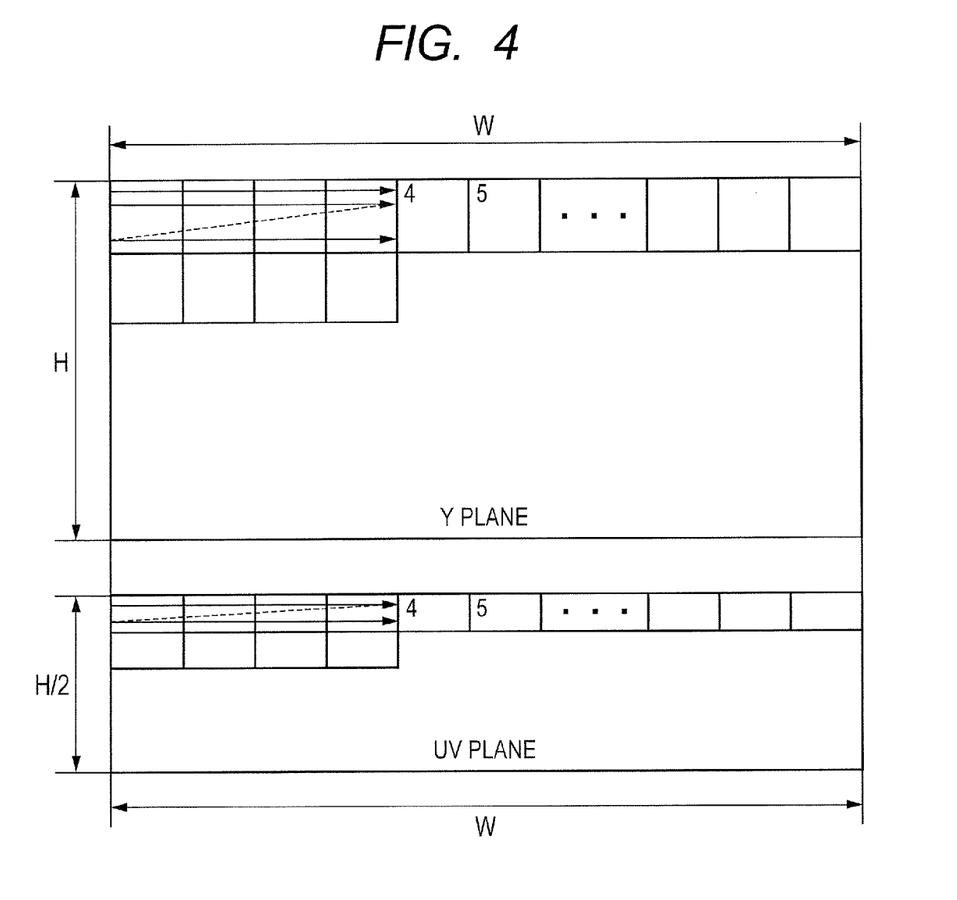
FIG. 4 is a diagram (1) illustrating an example of data reading from the decoded data memory by a format conversion unit in the image processing device illustrated in FIG. 1.

An example of an operation of the format conversion unit 116 will be described with reference to FIG. 4. In FIG. 4, one arrow indicates one operation of reading the data from the decoded data memory 120 by the format conversion unit 116.

In the example illustrated in FIG. 4, the format conversion unit 116 is configured to read out the format-converted data of one line in four blocks in one reading operation. For example, in a case where the progress signal PR from the progress notification unit 114 indicates that decoding of the data in the fourth block (the block 3) by the decoder 112 has been completed, the format conversion unit 116, first, reads out the data of the first line from the first block (the block 0) up to the fourth block of the Y plane and the UV plane from the decoded data memory 120 and perform format-conversion on the read-out data. After completion of format-conversion performed on these pieces of the decoded data, the format conversion unit 116 writes the format-converted data into the format-converted data memory 130, and reads out the data of the second line from the first block up to the fourth block of the Y plane and the UV plane and performs format-conversion on the read-out data simultaneously.

In the above-mentioned example, the block size is fixed throughout all the pictures. The image processing device 100 according to the present embodiment is allowed to cope with a situation that the block size is made variable as in the standards such as HEVC and the forth.

Figure 5:
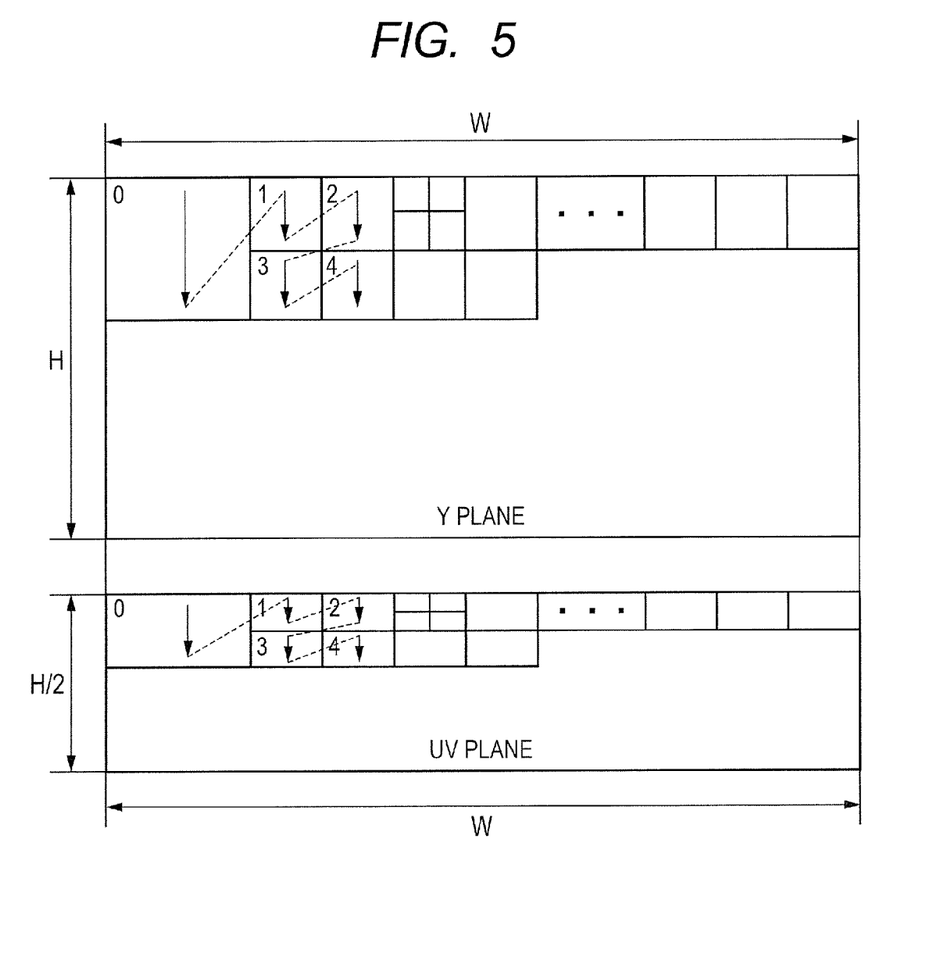
FIG. 5 is a diagram (2) illustrating an example of data decoding and writing into the decoded data memory by the decoder in the data processing device illustrated in FIG. 1.
Figure 6:
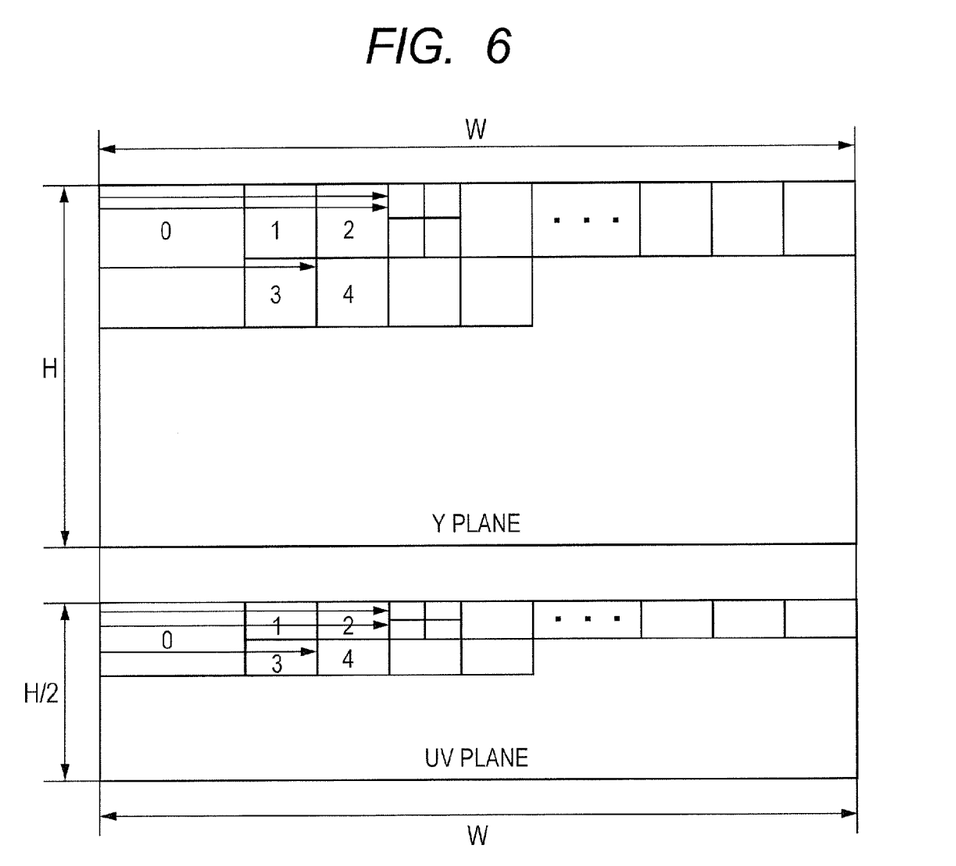
FIG. 6 is a diagram illustrating an example of data reading from the decoded data memory by the format conversion unit in the image processing device illustrated in FIG. 1.

Operational examples of the decoder 112 and the format conversion unit 116 in a case where the block size is made variable in one picture will be described with reference to FIG. 5 and FIG. 6.

First, with reference to FIG. 5, the operation of the decoder 112 will be described. As illustrated in FIG. 5, in case of this example, the decoder 112 decodes the data and writes the decoded data into the decoded data memory 120 in order of the blocks 0, 1, 2, 3, 4, . . . with regard to each picture. In this case, the height and the width of each of the blocks 1, 2, 3 and 4 are half the height and the width of the block 0.

The operation of the format conversion unit 116 will be described with reference to FIG. 6. As illustrated in FIG. 6, for example, when the progress signal PR from the progress notification unit 114 indicates that decoding of the data in the fourth block (the block 3) by the decoder 112 has been completed, the format conversion unit 116, first, reads out the data of the first line in the respective blocks from the first block (the block 0) up to the third block (the block 2) of the Y plane and the UV plane and performs format-conversion on the read-out data. After completion of format-conversion performed on these pieces of the decoded data, the format conversion unit 116 writes the format-converted data into the format-converted data memory 130, and reads out the data of the second line in the respective blocks from the first block up to the third block of the Y plane and the UV plane and performs format-conversion on the read-out data simultaneously.

Then, after completion of reading-out and format-conversion of the decoded data in the block 1 and the block 2, the format conversion unit 116 reads out the decoded data of the line which is the same as the first line in the block 3 in the block 0, and the data of the first line in the block 3 from the decoded data memory 120 and performs format-conversion on the read-out data.

The image processing device 100 is applicable to the situation that the block size which would be a unit for decoding is made variable and the same advantage as that when the block size is fixed is obtained.

Incidentally, although in the present embodiment, the progress notification unit 114 outputs the progress signal PR indicating that decoding of one-block data by the decoder 112 has been completed to the format conversion unit 116 per picture by way of example, the progress signal PR may be output to the format conversion unit 116 in units of the plurality of blocks upon completion of decoding of the data in the last block of the plurality of blocks.

Figure 7:
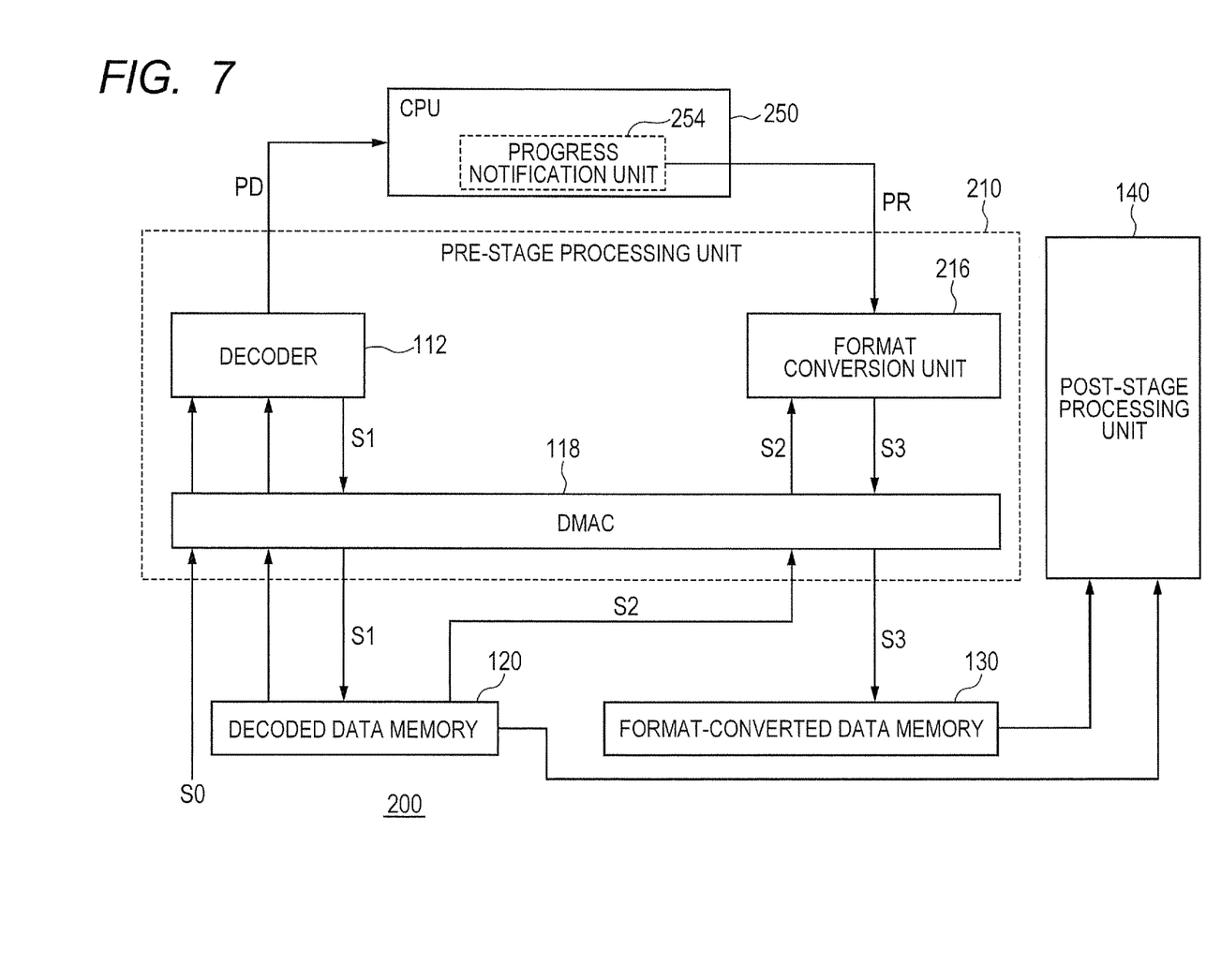
FIG. 7 is a diagram illustrating an example of an image processing device according to a second embodiment of the present invention.

Further, the progress notification unit 114 may output the progress signal PR indicating that decoding of the data of the entire picture concerned has been completed to the format conversion unit 116 per picture. An example of this case will be described using a second embodiment.

Second Embodiment

FIG. 7 illustrates an example of an image processing device 200 according to a second embodiment. The image processing device 200 is different from the image processing device in that a pre-stage processing unit 210 is included in place of the pre-stage processing unit 110, and the progress signal PR is output by a CPU 250.

The pre-stage processing unit 210 includes the decoder 112, a format conversion unit 216 and the DMAC 118, and also includes the progress notification unit 114 that the pre-stage processing unit 110 of the image processing device 100 includes.

In an image processing device of this type, the decoder is generally configured to output a signal indicating that decoding of one-picture data has been completed to the CPU. The CPU controls the entire of the image processing device in accordance with the above-mentioned signal. The decoder 112 in the image processing device 200 also outputs a picture decoding completion signal PD to the CPU 250 every time decoding of one-picture data is completed.

The CPU 250 has a function of outputting the progress signal PR to the format conversion unit 216 upon reception of the picture decoding completion signal PD, in addition to general control processing. This function is performed by an illustrated progress notification unit 254. The progress signal PR is a signal indicating that decoding of the data of the picture concerned has been completed and includes, for example, the number of the picture concerned.

Since the format conversion unit 216 recognizes that it is allowed to read out the decoded data from addresses ranging from an address (a base address) corresponding to the first pixel of the picture concerned to an address corresponding to the last pixel of the picture concerned when the progress signal PR is received, it sequentially reads out the decoded data of the picture concerned from the decoded data memory 120 and performs format-conversion on the read-out data.

Although there are cases when delay occurs more frequently than in the image processing device 100 because when decoding of one-picture data is not completed, the image processing device 200 according to the second embodiment is not allowed to start format-conversion of the data in the block decoding of which has already been completed in the picture, it is the same as the image processing device 100 in that it is allowed to execute image processing including decoding and format-conversion at a high speed by simple control.

Although the invention which has been made by the inventors of the present patent application has been specifically described on the basis of the preferred embodiments thereof, it goes without saying that the present invention is not limited to the embodiments which have been already described and may be modified in a variety of ways within a scope not departing from the gist of the invention.

For example, although in each of the above-mentioned embodiments, the progress notification unit outputs the number of the block concerned to the format conversion unit as the progress signal PR, a signal indicating an address that the decoded data in this block has been written into the decoded data memory may be output to the format conversion unit as the progress signal. Also in this case, it is allowed to obtain the advantage brought about by the present invention.

In addition, although, for example, in each of the above-mentioned embodiments, the decoded data memory and the format-converted data memory are separately illustrated, the decoded data memory and the format-converted data memory may be different regions in one memory.

In addition, although, for example, in each of the above-mentioned embodiments, the DMAC is utilized to efficiently gain access to the memory, access to the memory is not necessarily gained via the DMAC.

In addition, although in the image processing device 100 according to the first embodiment, the progress notification unit 114 is installed separately from the decoder 112 and the format conversion unit 116, the progress notification unit 114 may be built into either the decoder 112 or the format conversion unit 116. In this case, it is preferable to build the progress notification unit 114 into the decoder 112 for ready grasping of the progress of encoding by the decoder 112 and ready wiring.

In addition, in a case where the decoder 112 already has a signal which is equivalent to the progress signal PR that the progress notification unit 114 generates, it is not required to install the progress notification unit 114 separately from the decoder 112, and the decoder may commonly function as the progress notification unit 114.

In addition, in the second embodiment, the progress notification unit 254 in the CPU 250 outputs the number of the picture concerned as the progress signal PR. Alternatively, the progress notification unit 254 may generate and output a signal indicating an address that the decoded data of the picture concerned is stored in the decoded data memory 120 as the progress signal PR.

The invention claimed is:

1. An image processing device, comprising:
    a decoded data memory which stores decoded data obtained by decoding compressed image data, and outputs a writing notification indicating that writing of a decoded data in a certain block into the decoded data memory has been completed;
    a format-converted data memory which stores format-converted data obtained by performing format conversion on the decoded data;
    a decoder which decodes the compressed image data in units of blocks, and writes the decoded data in the blocks into the decoded data memory, and the decoder receives the writing notification from the decoded data memory and outputs the writing notification;
    a progress notifier which receives the writing notification from the decoder and generates and outputs a progress signal indicating a state of progress of decoding or a state of progress of writing into the decoded data memory which is being executed by the decoder based on the writing notification; and
    a format converter which, based on the progress signal, reads out the decoded data from the decoded data memory and performs the format conversion on the decoded data, and writes the format-converted data into the format converted data memory, the format converter being configured to acquire information indicating an address at which the decoded data which is readable from the decoded data memory is stored, from the progress signal sent from the progress notifier,
    wherein the progress notifier generates and outputs the progress signal per picture, every time decoding of one-block data or writing of the decoded data performed by the decoder is completed,
    wherein the progress notifier outputs a number of the block of the decoded data whose decoding by the decoder has been completed to the format converter as the progress signal,
    wherein the format converter acquires an address corresponding to the number of the block that the progress signal indicates in accordance with a correspondence relation between the number of the block and the address in the decoded data memory, and
    wherein the decoder receives a notification that writing of the decoded data in a certain block into the decoded data memory has been completed, and thereafter notifies the progress notifier of completion of writing of the decoded data in the certain block.

2. The image processing device according to claim 1, wherein the progress notifier generates and outputs a signal indicating a number of a latest block decoding of the compressed image data or writing of the decoded data into the decoded data memory as the progress signal per picture, every time decoding of one-block data is completed by the decoder or every time writing of one-block decoded data into the decoded data memory is completed by the decoder.

3. The image processing device according to claim 2, wherein the progress notifier comprises a counter for counting up a value per picture, in accordance with completion of decoding of one-block data or completion of writing of one-block decoded data into the decoded data memory by the decoder, and outputting the counted value as the progress signal.

4. The image processing device of claim 3, wherein the counted value is reset every time decoding or writing of one-picture data is completed.

5. The image processing device according to claim 2, wherein the progress notifier generates and outputs a signal indicating an address that data in the latest block is written into the decoded data memory as the progress signal, in place of the number of the latest block.

6. The image processing device according to claim 1, wherein the progress notifier is included in the decoder or the format converter.

7. The image processing device according to claim 1, wherein the progress notifier is included in a Central Processing Unit (CPU).

8. The image processing device according to claim 1, wherein the progress notifier generates and outputs a signal indicating a number of a latest picture decoding of the compressed image data or writing of the decoded data into the decoded data memory as the progress signal per picture, every time decoding of the compressed image data in the picture is completed by the decoder, or every time writing of the decoded data in the picture into the decoded data memory is completed by the decoder.

9. The image processing device according to claim 8, wherein the progress notifier generates and outputs a signal indicating an address that data in the latest picture has been written into the decoded data memory, in place of the number of the latest picture.

10. The image processing device according to claim 1, further comprising:
a post-stage processor which performs processing on at least one of the decoded data and the format-converted data.

11. The image processing device according to claim 1, wherein the format converter reads out the decoded data from the decoded data memory and performs format-conversion on the decoded data and writes the format-converted data into the format-converted data memory simultaneously with the decoding of the compressed image data by the decoder.

12. The image processing device of claim 1, further comprising:
a direct memory access controller (DMAC) which sequentially transfers a bitstream of the compressed image data to the decoder.

13. The image processing device of claim 1, wherein the format converter sets a timing at which a predetermined time has elapsed after reception of the progress signal as a timing at which the decoded data in the certain block becomes readable.

14. The image processing device of claim 1, wherein the format converter reads out the decoded data from the decoded data memory by defining a plurality of blocks as a read-out unit.

15. A processor for an image processing device which includes a first memory and a second memory, the processor comprising:
a decoder which decodes compressed image data in units of blocks, and writes the decoded data in the blocks into the first memory;
a progress notifier which generates and outputs a progress signal per picture, every time decoding of one-block data or writing of the decoded data performed by the decoder is completed, the progress signal indicating a state of progress of decoding or a state of progress of writing into the first memory which is being executed by the decoder; and
a format converter which, based on the progress signal, reads out the decoded data from the first memory and performs format conversion on the decoded data, and writes the format-converted data into the second memory, the format converter being configured to acquire information indicating an address at which the decoded data which is readable from the first memory is stored, from the progress signal sent from the progress notifier,
wherein the progress notifier outputs a number of the block of the decoded data whose decoding by the decoder has been completed to the format converter as the progress signal, and
wherein the format converter acquires an address corresponding to the number of the block that the progress signal indicates in accordance with a correspondence relation between the number of the block and the address in the first memory,
wherein the decoder receives a notification that writing of the decoded data in a certain block into the first memory has been completed, and thereafter notifies the progress notifier of completion of writing of the decoded data in the certain block.

16. An image processing device, comprising:
a decoded data memory which stores decoded data obtained by decoding compressed image data, and outputs a writing notification indicating that writing of a decoded data in a certain block into the decoded data memory has been completed;
a format-converted data memory which stores format-converted data obtained by performing format conversion on the decoded data;
a decoder which decodes the compressed image data in units of blocks, and writes the decoded data in the blocks into the decoded data memory, and the decoder receives the writing notification from the decoded data memory and outputs the writing notification;
a progress notifier which receives the writing notification from the decoder and generates and outputs a progress signal indicating a state of progress of decoding or a state of progress of writing into the decoded data memory which is being executed by the decoder based on the writing notification; and
a format converter which, based on the progress signal, reads out the decoded data from the decoded data memory and performs the format conversion on the decoded data, and writes the format-converted data into the format converted data memory, the format converter being configured to acquire information indicating an address at which the decoded data which is readable from the decoded data memory is stored, from the progress signal sent from the progress notifier, wherein the progress notifier outputs a number of the block of the decoded data whose decoding by the decoder has been completed to the format converter as the progress signal, wherein the format converter acquires an address corresponding to the number of the block that the progress signal indicates in accordance with a correspondence relation between the number of the block and the address in the decoded data memory, and wherein the decoder receives a notification that writing of the decoded data in a certain block into the decoded data memory has been completed, and thereafter notifies the progress notifier of completion of writing of the decoded data in the certain block.

* * * * *